March 29, 1949.  C. R. NALLE  2,465,741
ADJUSTABLE SUPPORT FOR FURNITURE
AND THE LIKE
Filed Feb. 4, 1948
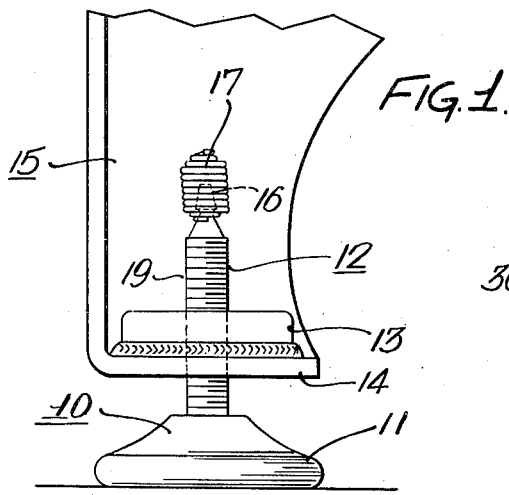
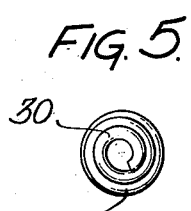
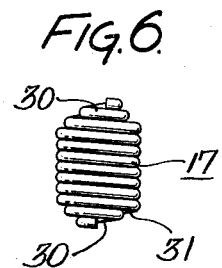
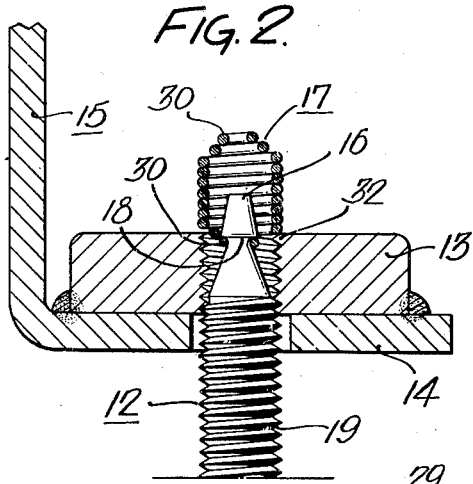
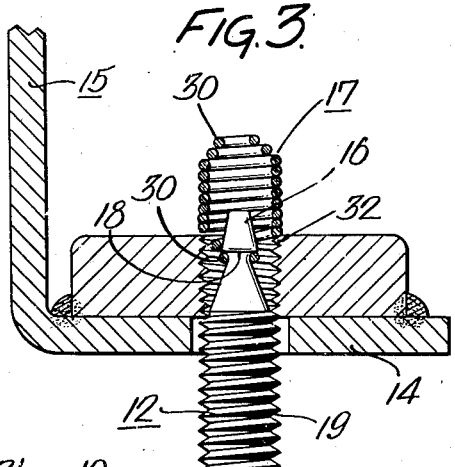
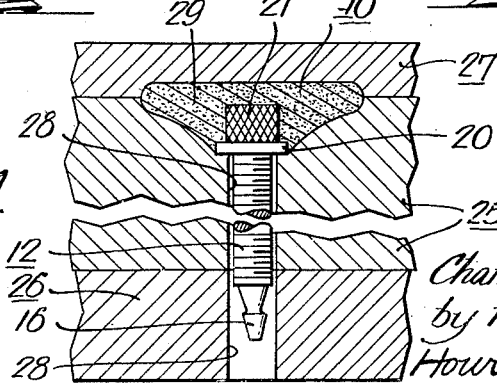
Inventor:
Charles R. Nalle
by his Attorneys
Howson & Howson Patented Mar. 29, 1949

2,465,741

UNITED STATES PATENT OFFICE 2,465,741

ADJUSTABLE SUPPORT FOR FURNITURE AND THE LIKE

Charles R. Nalle, Philadelphia, Pa.

Application February 4, 1948, Serial No. 6,273

8 Claims. (Cl. 16—42)

This invention relates to the construction and manufacture of adjustable furniture supports. The present invention is an improvement upon the adjustable support disclosed in my co-pending application Serial No. 575,625 and also includes details in the fabrication of such a support when the base member is made of a compression molded plastic.

Some articles of furniture, particularly refrigerators, stoves and washing machines, have sheet metal leg construction which enables the locking device of an adjustable support to be installed after the threaded stem of the support has been turned through the leg base. In the case of wooden furniture, where the support is used in a blind hole, the locking device in some constructions is inserted first, then a stationary threaded member attached to the leg, whereupon the threaded stem of the caster or "glide" is inserted through the threaded base and locked in the retainer. In other blind hole constructions, the stem may be inserted partially through a metal plate whereupon the retainer is installed and then the metal plate fastened to the furniture by means of screws or other similar devices in which event it is possible to install the retainer on the stem of the glide manually and the present construction is equally adapted to this expedient as well. The present construction contemplates the use of an internally threaded nut or supporting member which may be welded or integrally formed in the metallic leg of a refrigerator or stove, for example, and also which may be attached to the leg of a piece of wooden furniture. The retainer construction and the shape of the stem are such that the retainer may be readily installed and is maintained in locking relation with respect to the stem so that the stem may not be completely disengaged from the threaded member by unscrewing the stem. Furthermore, when the threaded portion of the stationary threaded member is of standard thickness, the distance from the first thread on the glide stem to the abutting portion of the retainer may be controlled to provide spring loaded contact between the stem and the stationary support.

I have found that a synthetic plastic base element for a glide has many advantages over a metallic base, since articles such as refrigerators, stoves, etc., are customarily placed on floors which require frequent washing. The strong chemicals used in washing solutions quickly corrode the metallic bases thus leaving a permanent stain on the floor surface. In addition, even though a non-ferrous metallic base be used to avoid rust, such metals ordinarily leave a mark on the floor when the article of furniture is moved. The provision, therefore, of a rigid plastic base for the glide which will not stain or mark the floor surface either from rust or from frictional contact therewith, is a distinct advantage.

The molding of a plastic base for such a glide has presented, however, particular difficulties due to the fact that the plastic material has a tendency to seep into the threaded stem during the molding process. This necessitates a thread cleaning operation which is expensive and costs much more than the articles themselves.

A primary object of the invention, therefore, is to provide a left-hand helical spring retainer for an adjustable furniture support, the body of the spring retainer being of greater diameter than the diameter of the stem and the ends of the retainer being of small enough diameter to extend into the threaded stem support.

A further object of the invention is to provide a rigid synthetic plastic base for a furniture glide.

A further object of the invention is to provide a stem of the type described, in which the axial distance between the first thread and the retainer shoulder is slightly less than the thickness of the internally threaded support member.

A still further object is to provide a flange on the lower end of the stem which acts as a seal during the molding operation of the plastic base element.

Further objects will be apparent from the specification and drawings in which:

Fig. 1 is an elevation showing my improved adjustable support installed in the leg of a sheet metal article of furniture;

Fig. 2 is an enlarged sectional detail of the stem showing the retainer just abutting the threaded nut;

Fig. 3 is a view similar to Fig. 2 but with the threads of the stem completely disengaged from the nut, thereby distending the retainer;

Fig. 4 is a sectional view showing the stem in position in the mold;

Fig. 5 is an end view of the helical spring retainer; and

Fig. 6 is a side elevation of the helical spring retainer.

An adjustable support designated generally at 10 has a plastic base 11 which is molded on the stem 12. In operation, the support is adapted to be threaded into a nut or internally threaded burr 13 which may be welded to the bottom 14 of a metallic furniture leg 15. It will be apparent that if the thickness of the bottom web 14 of leg 15 is sufficient, the nut may be dispensed with and the threads may be cut in web 14 itself.

Previous practice in an adjustable support of this type has been to utilize a plain threaded stem with no retainer and then upset the end of the stem by means of a cold chisel or hammer after the stem has been threaded through nut 13. The objections to this procedure have been that the end of the stem is extremely inaccessible for such an upsetting operation and unless extreme care be used, the stem is bent to such an extent that it does not turn freely in nut 13 or it is no longer vertical, thus preventing full contact of base member 11 with the floor. Furthermore, when a cold chisel is employed for the upsetting operation, the chisel frequently slips, causing the leg to be disfigured or the paint to be chipped.

I provide the end of the stem with a frustoconical nose 16 which has a dual purpose of facilitating application of the spring retainer 17 and also assists in removal of the stem during the molding operation as will be explained hereinafter. The largest diameter of tapered nose 16 is considerably less than the drilled diameter of nut 13 and forms a shoulder 18 against which the first convolution or coil of helical spring 17 seats. From thence the stem diameter gradually increases to the approximate root diameter of the threaded shank 19 as shown in Figs. 2 and 3, to form a second larger frusto-conical area. Threaded shank 19 terminates at shoulder 20 and a knurled portion 21 on the stem completes the construction of this member (Fig. 4).

In the manufacture of the stem proper, a rolling operation is utilized throughout, both for nose 16 as well as threaded portion 19. After the stem has been completed, it is dropped into the middle section 25 of a mold which is comprised of a lower section 26 and an upper section 27. In practice, the mold 25 is adapted to accommodate a large number of stems for production work. Mold 25 as well as mold 26, have a bore 28 adapted to receive threaded stem 19.

The diameter in bore 28 has been found to be of critical importance in preventing lost time during the molding operation. If the diameter of bore 28 provides a close fit with the outside diameter of threaded portion 19 of the stem, it has been found possible to reduce the danger of the molding compound 29 being forced into bore 28 in the molding process. This objective is important because any compound which gets into threads 19 must be cleaned by hand before the stem can be used. However, it was found that an attempt to control the tolerances of a rolled thread to the extent that a close fit in bore 28 could be provided, increased the cost of production excessively. Furthermore, it became necessary to knock out each stem from the mold individually, both when the stem itself was slightly oversize and also when a slight amount of compound found its way into the upper part of bore 28.

I have solved this problem by substantially increasing the diameter of bore 28 so that stem 19 always has a loose fit therein, regardless of the rolling tolerances, and providing in addition a shoulder 20 on the stem to act as a pressure seal, thus preventing any compound 29 from entering bore 28. Thus the shoulder of flange 20 not only acts as a seal to prevent clogged threads, but also enables the bore 28 of the mold to be increased to the point where the completed "glides" 10 can be removed from the mold merely by turning the mold over.

A further advantage of the construction resides in the fact that if for any reason it becomes necessary to drive the stems from the mold, nose 16 serves as a suitable means by which the glides can be removed from the mold portion 25 after lower mold 26 has been disconnected. Pounding on nose 16 cannot injure threads 19 as would be the case if the threads were carried the extreme length of the stem.

Referring now to Figs. 2 and 3, the construction of the retaining member 17 is of particular importance. First, the opposite ends of the retainer are identical so that it may be inserted with either end up; secondly, the diameter of the first convolution 30 of the spring is sufficient to seat tightly behind shoulder 18 of nose 16 but at the same time must be large enough so that the retainer may be readily pressed over the shoulder. When the stem has been unscrewed to the position shown in Fig. 2 in which about one thread on the stem remains in engagement with the threads on nut 13, the first large convolution 31 of the retainer contacts the face 32 of the nut 13. In this position, convolution 30 has partially entered the bore of the nut and it is for this reason that the diameter of shoulder 18 must be small enough to provide sufficient clearance between shoulder 18 and the threads in the nut, so that there is no danger of jamming the retainer in the threads. Further withdrawal of stem 19 so that the threads are completely disengaged, as shown in Fig. 3, places the first convolution of the retainer in tension, thus creating a pressure between the bottom of the nut 13 and the first thread on portion 19. The pressure thus created must be insufficient to disengage convolution 30 from shoulder 18 but at the same time must be ample to counterbalance the weight of the glide 10. Obviously, the thickness of nut 13 is the controlling factor in achieving this result and it will therefore be apparent that the thickness of the nut when the stem is in the position of Fig. 2 should be such that between one-half and one turn will completely disengage the threads. When the stem is under the slight tension caused by complete thread disengagement, it is only necessary to rotate the glide 10 in a clockwise direction to insure rethreading. If such tension were absent, it would be necessary to push upwardly on the glide in order to engage the threads thus the provision of such tension is of distinct advantage. In addition, the resistance to complete disengagement of the stem is desirable in preventing excessive turning when a piece of furniture is being moved.

For example, in a stem having a threaded shank $\frac{5}{16}$" in diameter and 18 threads per inch, I have found that the desired results enumerated above can be achieved when the distance from the shoulder formed by the nose 16 to the first thread on the stem is $\frac{1}{8}$", the diameter of the shoulder .190", the net diameter of the stem just behind the shoulder $\frac{3}{32}$", the thickness of the nut or threaded member $\frac{5}{32}$", and the spring wire forming the retainer .036".

The retainer 17 is wound in a left-hand or counter-clockwise manner so that there will be no tendency for the convolutions of the retainer to become wedged in the internal threads of nut 13 as might likely be the case with a right-hand spring when in the position shown in Fig. 3.

It will thus be apparent that I have provided an adjustable stem for furniture supports whether of the "glide" or caster type, which permits extremely low cost production and at the same time eliminates many serious disadvantages of prior constructions. In practice, the cost of the material for manufacturing the glides is so negligible that one extra operation may double or triple the cost of the finished product. It is therefore of extreme importance that the design of the stem be such that close manufacturing tolerances are unnecessary and at the same time an efficient, durable product is obtained.

I claim:

1. A stem for an adjustable furniture support comprising a threaded shank, a shoulder at one end of said shank, the diameter of the shoulder being substantially greater than that of the shank, a knurled extension terminating the stem, said shoulder being located between the extension and the shank, a double tapered nose at the opposite end of the stem, and a second shoulder between said tapered noses, the diameter of said second shoulder being less than the root diameter of the threaded shank.

2. An adjustable support assembly for furniture and the like, comprising an internally threaded member attached to the leg of an article of furniture, an adjustable support having a stem, a threaded shank on said stem adapted to engage said threaded member, a floor-engaging element attached to the bottom of said stem, a tapered nose formed at the top of said stem, said nose terminating in a shoulder in spaced relation to the upper terminus of the threads on the shank, a helical spring retainer formed by a length of spring wire wound in the opposite direction from the threads on the shank, a restricted convolution at each end of said retainer, said restricted convolution adapted to be expanded over and retained behind the shoulder on the stem.

3. Apparatus in accordance with claim 2, in which the distance between the shoulder on the stem and the first thread on the shank is such that when the threaded shank is unscrewed in the threaded member, a large convolution of the retainer abuts the upper surface of said threaded member, and the restricted convolution of the retainer enters into the bore of the threaded member.

4. Apparatus in accordance with claim 2, in which the maximum diameter of the shoulder on the stem is less than the drill diameter of the threaded member minus twice the diameter of the spring wire forming the retainer.

5. Apparatus in accordance with claim 2, in which the diameter of center convolutions of the retainer is greater than the drill diameter of the threaded member and the outside diameter of the end convolutions is less than the drill diameter of the threaded member.

6. Apparatus in accordance with claim 2, in which the relation between the distance from the shoulder to the first thread on the shank and the distance from the first center convolution of the retainer to the shoulder when the retainer is in place on the stem is such that the distance from said first center convolution of the retainer to the first thread on the shank is less than the thickness of the threaded portion of the internally threaded member attached to the furniture leg.

7. An adjustable glide member for furniture and the like comprising a threaded shank portion, a knurled portion at one end of the stem, a flange between the knurled portion and the threaded portion, the diameter of the flange being substantially greater than that of the shank, a double tapered nose at the opposite end of the stem, a shoulder between said tapered noses, the diameter of said shoulder being less than the root diameter of the threaded shank, and a synthetic plastic supporting element rigidly molded around said knurled portion of the stem.

8. A retainer construction for threaded members and the like comprising a helical spring having center coils of greater diameter than the diameter of the threaded member, a coil of reduced diameter at each end of the retainer and formed integrally with the center coils from a length of spring wire, the diameter of the reduced coils adapted to fit over an annular shoulder on the extremity of the threaded member.

CHARLES R. NALLE.

No references cited.